(12) United States Patent
Takeuchi et al.

(10) Patent No.: US 8,709,654 B2
(45) Date of Patent: Apr. 29, 2014

(54) POWER STORAGE DEVICE AND METHOD FOR MANUFACTURING THE SAME

(75) Inventors: Toshihiko Takeuchi, Kanagawa (JP); Minoru Takahashi, Nagano (JP); Takeshi Osada, Kanagawa (JP); Teppei Oguni, Kanagawa (JP); Takuya Hirohashi, Kanagawa (JP); Hiroyuki Tomisu, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/596,163

(22) Filed: Aug. 28, 2012

(65) Prior Publication Data

US 2013/0052537 A1 Feb. 28, 2013
US 2013/0316243 A2 Nov. 28, 2013

(30) Foreign Application Priority Data

Aug. 31, 2011 (JP) ................. 2011-189335

(51) Int. Cl.
*H01M 4/36* (2006.01)
*H01M 4/64* (2006.01)

(52) U.S. Cl.
USPC ............... 429/218.1; 429/231.8; 429/233

(58) Field of Classification Search
None
See application file for complete search history.

(56) References Cited

U.S. PATENT DOCUMENTS

| 4,628,015 | A | 12/1986 | Yata et al. |
| 4,764,853 | A | 8/1988 | Thomas et al. |
| 6,383,686 | B1 | 5/2002 | Umeno et al. |
| 6,685,804 | B1 | 2/2004 | Ikeda et al. |
| 7,179,561 | B2 | 2/2007 | Niu et al. |
| 7,745,047 | B2 | 6/2010 | Zhamu et al. |
| 7,842,432 | B2 | 11/2010 | Niu et al. |
| 7,939,218 | B2 | 5/2011 | Niu |
| 7,977,007 | B2 | 7/2011 | Niu et al. |
| 7,977,013 | B2 | 7/2011 | Niu et al. |

(Continued)

FOREIGN PATENT DOCUMENTS

| EP | 2 309 573 A1 | 4/2011 |
| JP | 2000-215887 | 8/2000 |

(Continued)

OTHER PUBLICATIONS

Zhou.X et al., "Graphene modified LiFePO4 cathode materials for high power lithium ion batteries ,", J. Mater. Chem. (Journal of Materials Chemistry), 2011, vol. 21, pp. 3353-3358.

(Continued)

*Primary Examiner* — John S Maples
(74) *Attorney, Agent, or Firm* — Nixon & Peabody LLP; Jeffrey L. Costellia

(57) ABSTRACT

A power storage device including a negative electrode having high cycle performance in which little deterioration due to charge and discharge occurs is manufactured. A power storage device including a positive electrode, a negative electrode, and an electrolyte provided between the positive electrode and the negative electrode is manufactured, in which the negative electrode includes a negative electrode current collector and a negative electrode active material layer, and the negative electrode active material layer includes an uneven silicon layer formed over the negative electrode current collector, a silicon oxide layer or a mixed layer which includes silicon oxide and a silicate compound and is in contact with the silicon layer, and graphene in contact with the silicon oxide layer or the mixed layer including the silicon oxide and the silicate compound.

18 Claims, 11 Drawing Sheets

(56) References Cited

U.S. PATENT DOCUMENTS

| | | | |
|---|---|---|---|
| 8,003,257 B2 | 8/2011 | Takeuchi et al. | |
| 8,278,011 B2 | 10/2012 | Zhu et al. | |
| 2004/0033419 A1* | 2/2004 | Funabiki | 429/218.1 |
| 2007/0131915 A1 | 6/2007 | Stankovich et al. | |
| 2008/0254296 A1 | 10/2008 | Handa et al. | |
| 2009/0110627 A1 | 4/2009 | Choi et al. | |
| 2009/0117467 A1 | 5/2009 | Zhamu et al. | |
| 2009/0123850 A1 | 5/2009 | Takeuchi et al. | |
| 2009/0202915 A1 | 8/2009 | Modeki et al. | |
| 2010/0021819 A1 | 1/2010 | Zhamu et al. | |
| 2010/0078591 A1 | 4/2010 | Sano et al. | |
| 2010/0081057 A1 | 4/2010 | Liu et al. | |
| 2010/0143798 A1 | 6/2010 | Zhamu et al. | |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0291438 A1 | 11/2010 | Ahn et al. | |
| 2010/0308277 A1 | 12/2010 | Grupp | |
| 2010/0330421 A1 | 12/2010 | Cui et al. | |
| 2011/0012067 A1 | 1/2011 | Kay | |
| 2011/0020706 A1 | 1/2011 | Nesper | |
| 2011/0070146 A1 | 3/2011 | Song et al. | |
| 2011/0111299 A1 | 5/2011 | Liu et al. | |
| 2011/0111303 A1 | 5/2011 | Kung et al. | |
| 2011/0121240 A1 | 5/2011 | Amine et al. | |
| 2011/0133131 A1 | 6/2011 | Zhou et al. | |
| 2011/0151290 A1 | 6/2011 | Cui et al. | |
| 2011/0159372 A1 | 6/2011 | Zhamu et al. | |
| 2011/0183203 A1 | 7/2011 | Du et al. | |
| 2011/0227000 A1 | 9/2011 | Ruoff et al. | |
| 2011/0229795 A1 | 9/2011 | Niu et al. | |
| 2011/0266654 A1 | 11/2011 | Kuriki et al. | |
| 2011/0269016 A1 | 11/2011 | Takeuchi et al. | |
| 2011/0294005 A1 | 12/2011 | Kuriki et al. | |
| 2011/0305950 A1 | 12/2011 | Kuriki et al. | |
| 2012/0003530 A1 | 1/2012 | Kuriki et al. | |
| 2012/0003807 A1 | 1/2012 | Furuno et al. | |
| 2012/0015247 A1 | 1/2012 | Yoshida | |
| 2012/0058397 A1 | 3/2012 | Zhamu et al. | |
| 2012/0070738 A1 | 3/2012 | Yoshida | |
| 2012/0088151 A1 | 4/2012 | Yamazaki et al. | |
| 2012/0088156 A1 | 4/2012 | Nomoto et al. | |
| 2012/0264020 A1* | 10/2012 | Burton et al. | 429/231.8 |
| 2012/0328962 A1 | 12/2012 | Takeuchi et al. | |
| 2013/0052536 A1* | 2/2013 | Belharouak et al. | 429/231.8 |

FOREIGN PATENT DOCUMENTS

| | | |
|---|---|---|
| JP | 2006-265751 | 10/2006 |
| JP | 2008-257894 | 10/2008 |
| JP | 2009-524567 | 7/2009 |
| JP | 2009-176721 | 8/2009 |
| JP | 2010-129332 | 6/2010 |
| JP | 2011-503804 | 1/2011 |
| JP | 2011-029184 | 2/2011 |
| JP | 2011-517053 | 5/2011 |
| WO | WO-2006/062947 A2 | 6/2006 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A2 | 12/2009 |
| WO | WO 2010-016545 A1 | 2/2010 |

OTHER PUBLICATIONS

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

English Translation of "Graphene: Functions and Applications", CMC Publishing Co., Ltd., pp. 171-172.

McDowell et al. "Novel Size and Surface Oxide Effects in Silicon Nanowires as Lithium Battery Anodes", Nano Letters, 2011, vol. 11, No. 9, pp. 4018-4025.

Padhi et al., "Phospho-Olivines as Positive-Electrode Materials for Rechargeable Lithium Batteries", Journal of the Electrochemical Society, Apr. 1, 1997, vol. 144, No. 4, pp. 1188-1194.

Chan et al., "High-Performance Lithium Battery Anodes Using Silicon Nanowires", Nature Nanotechnology, 2008, vol. 3, pp. 31-35.

Yonezawa et al., "Fabrication of Graphene Oxide Membrane by Electrophoretic Deposition", The 57$^{th}$ Spring Meeting, The Japan Society of Applied Physics and Related Societies, Proceedings of the Meeting, Mar. 17, 2010, pp. 17-404.

Yonezawa et al., "Fabrication of Graphene Oxide Membrane by Electrophoretic Deposition", The 57$^{th}$ Spring Meeting, The Japan Society of Applied Physics and Related Societies, Proceedings of the Meeting, Mar. 17, 2010, pp. 17-040.

L. F. Cui et al., "Crystalline-Amorphous Core-Shell Silicon Nanowires for High Capacity and High Current Battery Electrodes", *Nano Letters*, 2009, vol. 9, No. 1, pp. 491-495.

T. I. Kamins et al., "Ti-catalyzed Si nanowires by chemical vapor deposition: Microscopy and growth mechanisms", *J. Appl. Phys.*, Jan. 15, 2001, vol. 89, No. 2, pp. 1008-1016.

Ueno, English Translation of "Graphene: Functions and Applications", Jul. 31, 2009, CMC Publishing Co., Ltd., pp. 171-172.

\* cited by examiner

POWER STORAGE DEVICE AND METHOD FOR MANUFACTURING THE SAME

BACKGROUND OF THE INVENTION

1. Field of the Invention

The present invention relates to a power storage device and a method for manufacturing the power storage device.

2. Description of the Related Art

In recent years, power storage devices such as lithium-ion secondary batteries, lithium-ion capacitors, and air cells have been developed.

An electrode for a power storage device is manufactured by forming an active material over a surface of a current collector. As the active material, a material which is capable of occluding and releasing ions serving as carriers, such as carbon or silicon, is used. For example, silicon or phosphorus-doped silicon can occlude about four times as many ions serving as carriers as carbon. Thus, silicon or phosphorus-doped silicon has higher theoretical capacity than carbon and is advantageous in increasing the capacity of a power storage device (e.g., Patent Document 1).

However, an increase in the amount of occluded ions serving as carriers leads to a big change in the volume accompanied by occlusion and release of ions serving as carriers in the charge and discharge cycle and also leads to pulverization of silicon, which causes a problem in reliability.

Thus, silicon particle nuclei are coated with a carbon layer, whereby pulverization of silicon is prevented. The silicon particle nuclei contain silicon oxide as an impurity, and the silicon is coated with the carbon layer (see Patent Document 1).

On the other hand, in recent years, the use of graphene as a conductive electronic material in semiconductor devices has been studied. Graphene refers to a one-atom-thick sheet of carbon molecules having $sp^2$ bonds.

Graphene is chemically stable and has favorable electric characteristics and thus has been expected to be applied to channel regions of transistors, vias, wirings, and the like included in semiconductor devices. In addition, an active electrode material is coated with graphene in order to increase the conductivity of an electrode material for a lithium-ion battery (see Patent Document 2).

REFERENCE

Patent Documents

[Patent Document 1] Japanese Published Patent Application No. 2000-215887
[Patent Document 2] Japanese Published Patent Application No. 2011-029184

SUMMARY OF THE INVENTION

However, in the case where silicon particles are used for a negative electrode active material, it has been difficult to suppress pulverization which is caused due to the charge and discharge cycle even when the silicon particles are coated with a carbon layer. Thus, in one embodiment of the present invention, a power storage device including a negative electrode having high cycle performance in which little deterioration due to its charge and discharge occurs is manufactured.

One embodiment of the present invention is a power storage device which is provided with a negative electrode including a negative electrode active material layer. The negative electrode active material layer includes an uneven silicon layer formed over a negative electrode current collector; a silicon oxide layer or a mixed layer including silicon oxide and a silicate compound, which is in contact with silicon layer; and graphene in contact with the silicon oxide layer or the mixed layer including the silicon oxide and the silicate compound.

The uneven silicon layer includes a common portion covering the entire surface of the negative electrode current collector and projected portions which extend from the common portion. Since the uneven silicon layer is used in the negative electrode active material layer, the surface area of the negative electrode active material layer is large. Accordingly, in the case where the negative electrode is mounted on the power storage device, it is possible to perform charge and discharge at high speed, which enables the power storage device to have further improved charge and discharge capacity. In addition, since there is a space between the adjacent projected portions, the contact between the projected portions can be prevented even when the negative electrode active material layer is expanded due to charge, which prevents collapse and peeling of the negative electrode active material layer caused by the expansion of the projected portions. As a result, the power storage device having improved cycle performance can be manufactured.

In addition, the silicon oxide layer or the mixed layer including the silicon oxide and the silicate compound is provided over the surface of the uneven silicon layer. When the power storage device is charged, the silicon oxide layer occludes carrier ions, so that part of the silicon oxide becomes a silicate compound containing carrier ions. Therefore, in the power storage device which has been charged one time, the silicon oxide layer becomes the mixed layer including silicon oxide and the silicate compound containing carrier ions. The silicate compound containing carrier ions serves as a path through which carrier ions transfer. In addition, since the silicon oxide layer or the mixed layer including the silicon oxide and the silicate compound can relax expansion and contraction of the silicon layer caused by charge and discharge, the collapse of the silicon layer due to charge and discharge can be prevented.

Graphene includes single-layer graphene or multilayer graphene. In addition, graphene may contain oxygen at 2 atomic % or more and 11 atomic % or less, preferably at 3 atomic % or more and 10 atomic % or less. Graphene is provided over the surface of the negative electrode active material layer, whereby an increase in the thickness of a film (solid electrolyte interface (SEI)) formed over the surface of the negative electrode active material layer can be prevented. As a result, it becomes possible to suppress a reduction in discharge capacity and degradation of an electrolyte solution.

According to one embodiment of the present invention, a power storage device including a negative electrode having high cycle performance in which little degradation due to charge and discharge occurs can be manufactured. In addition, a power storage device having a high discharge capacity can be manufactured.

DETAILED DESCRIPTION OF THE INVENTION

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

(Embodiment 1)

In this embodiment, the structure of a negative electrode of a power storage device having high cycle performance in which little deterioration due to charge and discharge occurs, and a method for manufacturing the negative electrode will be described with reference to FIGS. 1A to 1D and FIGS. 2A to 2C.

Figure 1A:
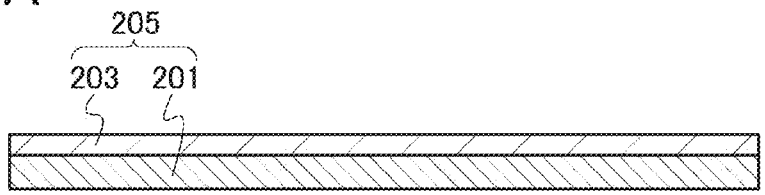
FIGS. 1A to 1D are cross-sectional views illustrating a negative electrode.

FIG. 1A is a cross-sectional view of a negative electrode 205. In the negative electrode 205, a negative electrode active material layer 203 is formed over a negative electrode current collector 201.

Note that an active material refers to a substance which relates to occlusion and release of ions serving as carriers (hereinafter referred to as carrier ions). An active material layer includes a conductive agent, a binder, a silicon oxide layer or a mixed layer described in this embodiment, graphene, or the like in addition to the active material. Therefore, the active material and the active material layer are distinguished from each other.

A secondary battery in which lithium ions are used as carrier ions is referred to as a lithium-ion secondary battery. Examples of carrier ions which can be used instead of lithium ions include alkali-metal ions such as sodium ions and potassium ions; alkaline-earth metal ions such as calcium ions, strontium ions, and barium ions; beryllium ions; magnesium ions; and the like.

Here, the specific structure of the negative electrode 205 is described with reference to FIGS. 1B to 1D. In this embodiment, typical examples of the negative electrode active material layer 203 are described using a negative electrode active material layer 203a in FIG. 1B, a negative electrode active material layer 203b in FIG. 1C, and a negative electrode active material layer 203c in FIG. 1D.

Figure 1B:
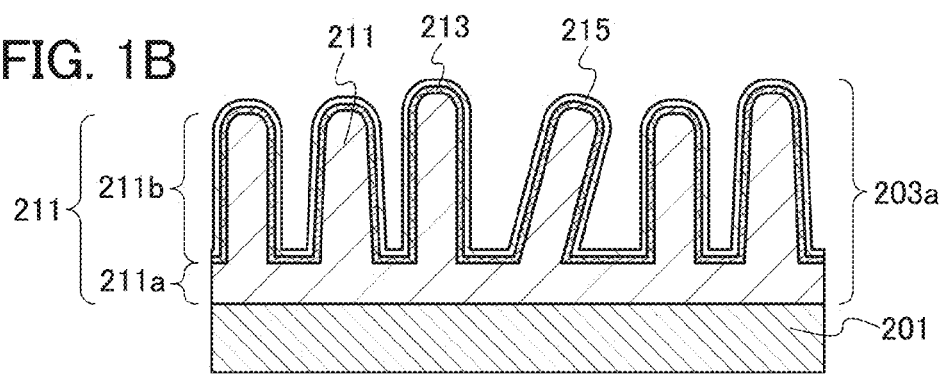

FIG. 1B is an enlarged cross-sectional view of the negative electrode in which the negative electrode active material layer 203a is formed over the negative electrode current collector 201. The negative electrode active material layer 203a includes an uneven silicon layer 211, a silicon oxide layer 213 covering a surface of the silicon layer 211, and graphene 215 covering the silicon oxide layer 213.

The negative electrode current collector 201 may be formed using a metal element with high conductivity, typified by platinum, aluminum, copper, or titanium. Note that the negative electrode current collector 201 is preferably formed using an aluminum alloy to which an element which improves heat resistance, such as silicon, titanium, neodymium, scandium, or molybdenum, is added. Alternatively, the negative electrode current collector 201 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like.

The negative electrode current collector 201 can have a foil shape, a plate shape, a net shape, or the like as appropriate.

Silicon which is capable of occluding and releasing ions serving as carriers is used for the uneven silicon layer 211. Alternatively, silicon to which an impurity element imparting one conductivity type, such as phosphorus or boron, is added may be used. The silicon to which the impurity element imparting one conductivity type, such as phosphorus or boron, is added has higher conductivity; therefore, the conductivity of the negative electrode can be increased. Accordingly, the discharge capacity of the power storage device can be further increased.

The uneven silicon layer 211 includes a common portion 211a and projected portions 211b which extend from the common portion 211a. The common portion 211a corresponds to a region which is in contact with the entire surface of the negative electrode current collector 201. The projected portion 211b has a columnar shape such as a cylinder shape or a prism shape, or a needle shape such as a cone shape or a pyramid shape as appropriate. Note that the projected portions 211b may have a whisker-like shape (string-like shape or fiber-like shape). The top of the projected portion 211b may be curved. Note that the common portion 211a and the projected portions 211b may be formed using the same material or different materials.

Note that the boundary between the common portion 211a and the projected portions 211b is not clear. Therefore, in the silicon layer 211, a plane which includes the bottom of the deepest valley among valleys which are formed between the plurality of projected portions 211b and is parallel to the surface of the negative electrode current collector 201 is defined as the boundary between the common portion 211a and the projected portions 211b.

The longitudinal directions of the projected portions 211b do not need to be oriented in one direction and may be irregular. It is preferable that the longitudinal directions of the projected portions 211b are irregular because one projected portion is in contact with another projected portion in some cases, which prevents peeling (or detachment) of the projected portions 211b at the time of charge and discharge.

Note that a direction in which the projected portion 211b extends from the common portion 211a is referred to as a longitudinal direction, and a cross section taken along the longitudinal direction is referred to as a longitudinal cross section. In addition, a cross section taken along a plane which is substantially vertical to the longitudinal direction of the projected portion 211b refers to a transverse cross section.

A width of the projected portion 211b in the transverse cross section is greater than or equal to 0.2 µm and less than or equal to 10 µm, preferably greater than or equal to 1 µm and less than or equal to 5 µm. In addition, the length of the projected portion 211b is greater than or equal to 3 µm and less than or equal to 1000 µm, preferably greater than or equal to 6 µm and less than or equal to 200 µm.

Note that the "length" of the projected portion 211b refers to a distance between the common portion 211a and a top (or a top surface) of the projected portion 211b in the direction along the axis which passes through the center of the top of the projected portion 211b in the cross section along the longitudinal direction.

Note that the silicon layer 211 is formed using amorphous silicon or crystalline silicon. In FIG. 1B, the silicon layer 211 is formed using amorphous silicon.

Figure 1C:
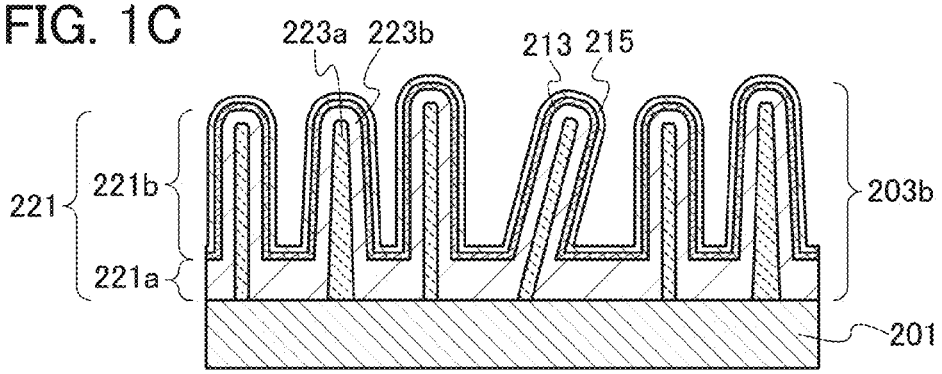

In addition, as illustrated in the enlarged cross-sectional view of FIG. 1C, a common portion 221a and projected portions 221b in a silicon layer 221 may include cores 223a formed of crystalline silicon and an outer shell 223b formed of amorphous silicon. The outer shell 223b formed of amorphous silicon is resistant to a change in volume caused by occlusion and release of ions (e.g., relaxes stress caused by the change in volume). In addition, the cores 223a formed of crystalline silicon are excellent in conductivity and ion mobility, and occlude and release ions at a high speed per unit mass. Therefore, the structure of the negative electrode provided with the silicon layer 221 including the cores 223a and the outer shell 223b enables charge and discharge at high speed. Accordingly, a power storage device in which charge and discharge capacity are increased and cycle performance is improved can be manufactured.

In addition, the silicon layer 221 illustrated in FIG. 1C is provided in the negative electrode active material layer 203b, whereby the adhesion between the negative electrode current collector 201 and the silicon layer 221 is increased. This is because when a region which is in contact with the negative electrode current collector 201 is mostly formed of amorphous silicon, the region has high adaptability with respect to the surface of the negative electrode current collector 201. In other words, amorphous silicon is more likely to be compatible with the surface of the negative electrode current collector 201. In addition, in the case where the negative electrode is mounted on a power storage device, owing to resistance to a change in voltage caused by occlusion and release of ions (e.g., relaxation of stress caused by volume expansion), collapse and peeling of the negative electrode active material layer which are caused by repeated charge and discharge can be prevented, which enables the power storage device to have further improved cycle performance.

Figure 1D:
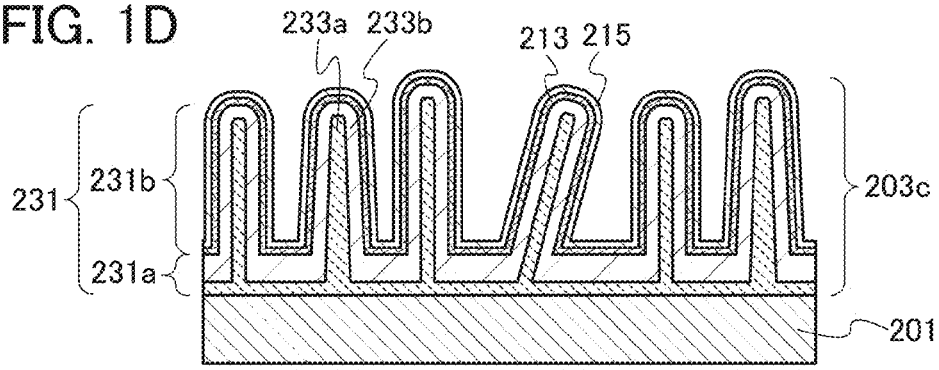

In addition, as illustrated in the enlarged cross-sectional view of FIG. 1D, a common portion 231a and projected portions 231b may include cores 233a formed of crystalline silicon and an outer shell 233b formed of amorphous silicon. Note that the cores 233a which are provided in the adjacent projected portions 231b are connected to each other in the common portion 231a through crystalline silicon which is in contact with the negative electrode current collector 201.

A silicon layer 231 illustrated in FIG. 1D is included in the negative electrode active material layer 203c, whereby a wide range of the crystalline silicon, which is excellent in conductivity and ion mobility, is in contact with the negative electrode current collector 201. Therefore, the conductivity of the entire negative electrode 205 can be further improved. Accordingly, in the case where this embodiment is applied to a power storage device, it is possible to perform charge and discharge at higher speed, which enables the power storage device to have further improved charge and discharge capacity.

The width of each of the core 223a and the core 233a in the transverse cross section is greater than or equal to 0.2 μm and less than or equal to 3 μm, preferably greater than or equal to 0.5 μm and less than or equal to 2 μm.

The length of each of the core 223a and the core 233a is not particularly limited but may be greater than or equal to 0.5 μm and less than or equal to 1000 μm, preferably greater than or equal to 2.5 μm and less than or equal to 100 μm.

In the negative electrode 205, the surface area of the negative electrode active material layer 203 is larger than that of a plate negative electrode active material layer by the surface area of the projected portion 211b, 221b, or 231b. Accordingly, in the case where the negative electrode 205 is mounted on a power storage device, it is possible to perform charge and discharge at high speed, which enables the power storage device to have further improved charge and discharge capacity. In addition, since there is a space between the adjacent projected portions 211b, 221b, or 231b, the contact between the projected portions can be prevented even when the negative electrode active material layer is expanded due to charge, which prevents collapse and peeling of the negative electrode active material layer caused by the expansion of the projected portions. As a result, the power storage device having improved cycle performance can be manufactured.

Note that the negative electrode active material layer 203 may function as a current collector in the negative electrode without the use of the negative electrode current collector 201. In addition, in the case where a metal material which forms silicide is used for the negative electrode current collector 201, a silicide layer is formed in part of the negative electrode current collector 201 on a side which is in contact with the negative electrode active material layer 203 in some cases. When a metal material which forms silicide is used for the negative electrode current collector 201, any of the following is formed as the silicide layer: titanium silicide, zirconium silicide, hafnium silicide, vanadium silicide, niobium silicide, tantalum silicide, chromium silicide, molybdenum silicide, cobalt silicide, nickel silicide, or the like.

The thickness of the silicon oxide layer 213 is preferably greater than or equal to 2 nm and less than or equal to 10 nm. The silicon oxide layer 213 is provided over the silicon layer 211, whereby ions serving as carriers are inserted into the silicon oxide at the time of charge of the power storage device. As a result, an alkali metal silicate compound such as $Li_4SiO_4$, $Na_4SiO_4$, or $K_4SiO_4$, an alkaline earth metal silicate such as $Ca_2SiO_4$, $Sc_2SiO_4$, or $Ba_2SiO_4$, or a silicate compound such as $Be_2SiO_4$ or $Mg_2SiO_4$ is formed. Any of these silicate compounds functions as a path through which carrier ions transfer. In addition, since the silicon oxide layer 213 is provided, expansion of the silicon layers 211, 221, and 231 can be suppressed. This makes it possible to suppress collapse of the silicon layers 211, 221, and 231 while keeping the discharge capacity. Note that even when discharge is performed after charge, the silicon oxide layer 213 becomes a mixed layer of the silicon oxide and the silicate compound because not all of the metal ions which are to be carrier ions are released from the silicate compound which is formed in the silicon oxide layer 213 and some of the metal ions are left.

When the thickness of the silicon oxide layer 213 is less than 2 nm, it is difficult to relax the expansion of the silicon layer 211 which is caused by charge and discharge. On the other hand, when the thickness of the silicon oxide layer 213 is greater than 10 nm, the transfer of ions serving as carriers becomes difficult, resulting in a reduction in the discharge capacity. The silicon oxide layer 213 is provided over the silicon layers 211, 221, and 231, which makes is possible to relax the expansion and contraction of the silicon layers 211, 221, and 231 caused by charge and discharge and suppress the collapse of the silicon layers.

Here, a lithium diffusion coefficient D in a region having a low lithium concentration (also referred to as a rarefied concentration region) in the silicon oxide layer 213 formed over the surface of the silicon layer 211 is calculated, and influence of the silicon oxide layer 213 upon the diffusion of lithium to the silicon layer 211 is described.

First, a calculation method is described.

The motion of atoms is examined by numerically solving their respective equations of motion using classical molecular dynamics calculation. Note that as classical molecular dynamics calculation software for performing this calculation, SCIGRESS ME manufactured by FUJITSU LIMITED was used.

In the calculation, as an empirical potential which characterizes the interaction between atoms, Born-Mayer-Huggins potential was used for the interactions between Si and Si, Si and O, and O and O, and Lennard-Jones potential was used for the interactions between Si and Li, Li and O, and L and Li. A mean-square displacement (MSD) of lithium which is obtained by a result of the calculation can be expressed as Formula 1.

$$MSD = \langle |r(t)-r(0)|^2 \rangle_t \qquad \text{[Formula 1]}$$

Note that r(t) represents a position of the lithium at a time t, and $\langle \rangle_t$ represents the time average.

In addition, the lithium diffusion coefficient D is obtained by Einstein relation shown in Formula 2.

$$MSD = \lim_{t \to \infty} \langle |r(t) - r(0)|^2 \rangle_t = 6Dt \qquad \text{[Formula 2]}$$

In other words, the lithium diffusion coefficient D can be obtained by the slope of a graph in a region where the mean-square displacement (MSD) of the lithium becomes a linear shape. Large lithium diffusion coefficient D means that the diffusion of lithium is likely to occur.

Next, a model of the calculation is described.

Figure 11A:
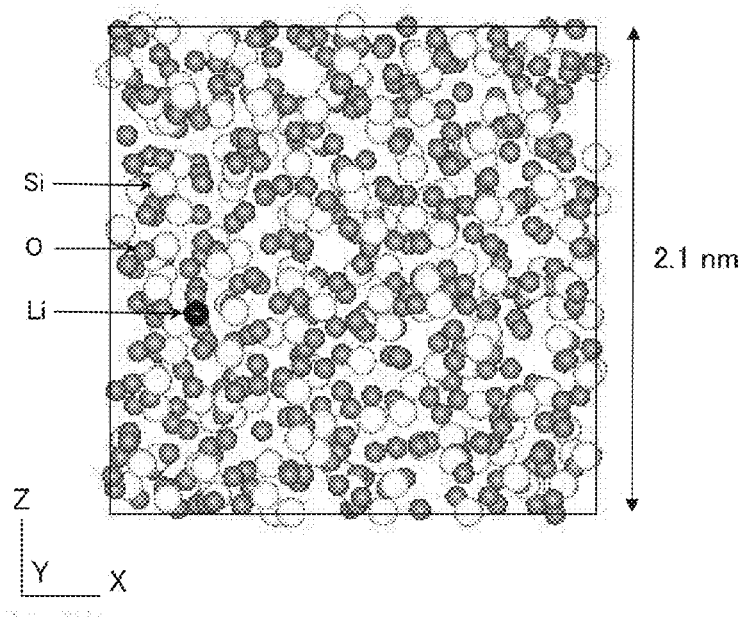
FIGS. 11A and 11B are diagrams describing a model used for calculation.

An initial structure in the calculation for finding the state where lithium is diffused is shown in FIG. 11A. One lithium atom is put in a square silicon oxide layer with a length of 2.1 nm on a side. In the calculation model, classical molecular dynamics calculation was performed for 8 nsec (with time intervals of 0.2 fsec×40,000,000 steps) where the number of atoms, the volume (at the density of 2.3 g/cm$^3$), and the temperature (27° C.) were fixed. Here, the three-dimensional periodic boundary conditions are used in the calculation for finding the state where lithium is diffused, whereby the silicon oxide layer in the three-dimension is calculated.

Figure 11B:
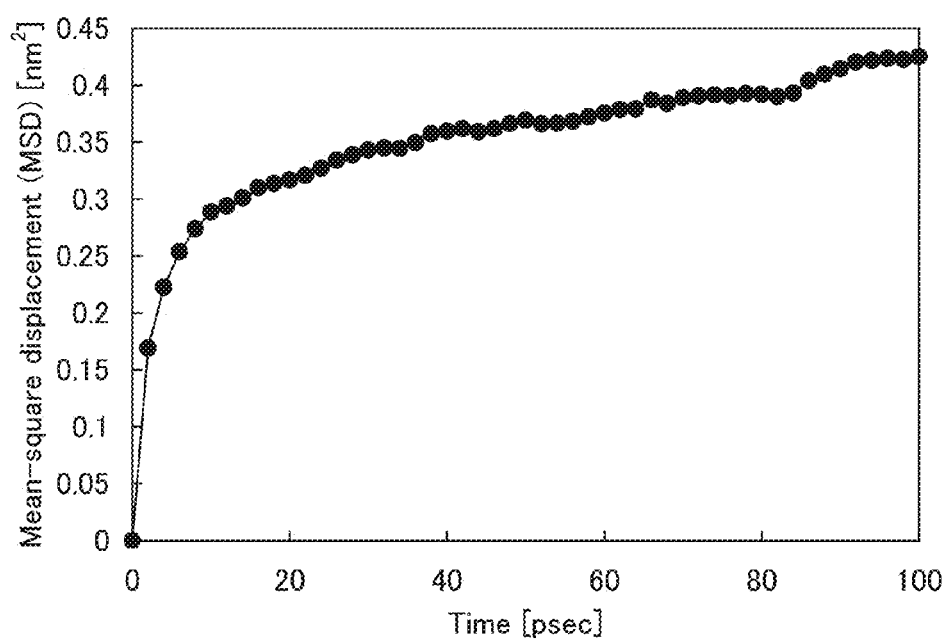

Next, the mean-square displacement (MSD) of the lithium in the silicon oxide layer which is obtained by the calculation is shown in FIG. 11B.

In FIG. 11B, the slope of a curve in a region where the slope of the curve is substantially constant (50 psec to 100 psec) is $1.2 \times 10^{-3}$ nm$^2$/psec. The region where the slope of the curve is substantially constant in FIG. 11B satisfies Formula 2. The slope of Formula 2 is 6D; therefore, the lithium diffusion coefficient D is $2.0 \times 10^{-6}$ cm$^2$/sec.

A time during which charge and discharge are performed is one hour at a charge and discharge rate of 1.0 C and five hours at a charge and discharge rate of 0.2 C. In the case of the charge and discharge for one hour, the mean-square displacement (MSD) of lithium diffused into the silicon oxide layer is $4.3 \times 10^{-2}$ cm$^2$ from Formula 2, and a diffusion distance of the lithium is $2.1 \times 10^{-1}$ cm. Thus, the diffusion distance of the lithium is sufficiently larger than the thickness of the silicon oxide layer (several nanometers). This result shows that the diffusion of the lithium into the silicon layer through the silicon oxide layer is hardly blocked. That is, the influence of the silicon oxide layer upon the diffusion of lithium to the silicon layer is small.

The graphene 215 includes single-layer graphene or multilayer graphene. The graphene 215 has a sheet-like shape with a length of several micrometers. The single-layer graphene refers to a one-atom-thick sheet of carbon molecules having sp$^2$ bonds. In the single-layer graphene, six-membered rings formed of carbon are arranged in a plane direction. In part of the single-layer graphene, a poly-membered ring which is obtained when a carbon bond in part of a six-membered ring is broken, such as a seven-membered ring, an eight-membered ring, a nine-membered ring, or a ten-membered ring, is formed.

Note that the poly-membered ring may be formed of carbon and oxygen. Alternatively, oxygen may be bonded to carbon of the poly-membered ring. In the case where graphene contains oxygen, a carbon bond in part of a six-membered ring is broken, and oxygen is bonded to the carbon whose bond is broken, whereby the poly-membered ring is formed. Therefore, an opening serving as a path through which ions can transfer is included in the bond of carbon and oxygen. That is, as the proportion of oxygen included in graphene is increased, the proportion of openings serving as paths through which ions can transfer becomes large.

Note that the graphene 215 contains oxygen, the proportion of the oxygen is greater than or equal to 2 atomic % and less than or equal to 11 atomic %, preferably greater than or equal to 3 atomic % and less than or equal to 10 atomic % of the total. As the proportion of oxygen becomes lower, the conductivity of the graphene can be increased. As the proportion of oxygen becomes higher, more openings serving as paths through which ions transfer can be formed.

In the case where the graphene 215 is multilayer graphene, the graphene 215 includes a plurality of single-layer graphenes, and typically includes 2 to 100 sheets of single-layer graphene. When the single-layer graphenes contain oxygen, an interlayer distance between the single-layer graphenes is greater than 0.34 nm and less than or equal to 0.5 nm, preferably greater than or equal to 0.38 nm and less than or equal to 0.42 nm, more preferably greater than or equal to 0.39 nm and less than or equal to 0.41 nm. In the case of general graphite, an interlayer distance between single-layer graphenes is 0.34 nm. Since the interlayer distance between the single-layer graphenes in the graphene 215 is longer than that in general graphite, ions can easily transfer in a direction parallel to the surface of the single-layer graphene in the graphene 215. The graphene 215 contains oxygen, includes single-layer or multilayer graphene which includes a poly-membered ring, and openings in places. Therefore, in the case where the graphene 215 is multilayer graphene, ions can transfer in the direction parallel to the surface of the single-layer graphene, i.e., through a space between the single-layer graphenes, and in the direction perpendicular to the surface of the multilayer graphene, i.e., through the openings formed in the single-layer graphenes.

In addition, since the graphene 215 functions as a negative electrode active material, the graphene 215 can increase the discharge capacity of the power storage device.

When silicon is used for a negative electrode active material, the theoretical occlusion capacity is high as compared to that in the case where graphite is used as a negative electrode active material; therefore, the use of silicon for a negative electrode active material leads to a reduction in cost and miniaturization of the power storage device.

Note that when silicon is used for the negative electrode active material, the volume of the silicon is almost quadrupled owing to occlusion of ions serving as carriers. Therefore, the negative electrode active material layer 203 becomes friable due to charge and discharge, so that part of the negative electrode active material layer 203a collapses. However, since the silicon oxide layer 213 and the graphene 215 cover the peripheries of the silicon layers 211, 221, and 231, the collapse of the negative electrode active material layer 203 due to volume expansion can be prevented.

In the power storage device, when the surface of the negative electrode active material layer 203 is in contact with an electrolyte, the electrolyte and the negative electrode active material react with each other, so that a film is formed over a surface of the negative electrode. The film is called an SEI, which is considered to be needed for relaxation of reaction between an electrode and an electrolyte and stabilization. However, when the thickness of the film is increased, carrier ions are less likely to be occluded in the negative electrode, leading to problems such as a reduction in conductivity for carrier ions between the negative electrode and the electrolyte solution, a decrease in discharge capacity due to the reduction, and the like.

When the surface of the negative electrode active material layer 203a is coated with the graphene 215, an increase in thickness of the film can be prevented, so that a decrease in discharge capacity can be suppressed Next, a method for forming the negative electrode active material layer 203 is described with reference to FIGS. 2A to 2C. Here, as one example for describing the negative electrode active material layer 203, the negative electrode active material layer 203a illustrated in FIG. 1B is used.

Figure 2A:
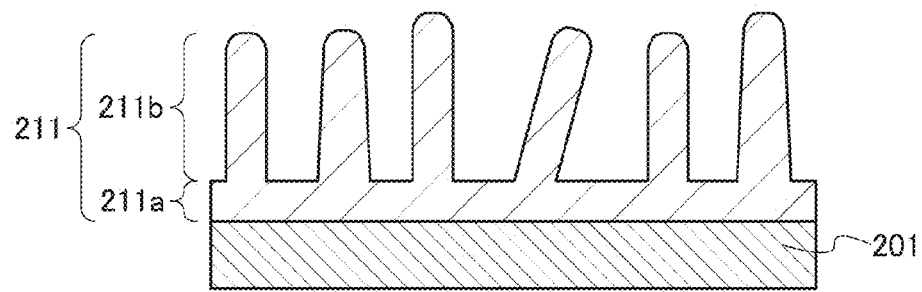
FIGS. 2A to 2C are cross-sectional views illustrating a method for manufacturing a negative electrode.

As illustrated in FIG. 2A, the uneven silicon layer 211 is formed over the negative electrode current collector 201. The silicon layer 211 includes the common portion 211a covering the surface of the negative electrode current collector 201 and the projected portions 211b provided over the common portion 211a.

The uneven silicon layer 211 can be formed over the negative electrode current collector 201 by a printing method, an inkjet method, a CVD method, or the like. Alternatively, the uneven silicon layer 211 can be formed over the negative electrode current collector 201 in such a manner that a film-shaped silicon layer is formed by a coating method, a sputtering method, an evaporation method, or the like, and part of the silicon layer is selectively removed.

Here, as one example of a method for forming the uneven silicon layer 211, a method employing a low pressure CVD (LPCVD) method is described below.

In the case where the silicon layer 211 is formed by an LPCVD method, a temperature at the formation of the silicon layer 211 is set to higher than 400° C. and lower than or equal to a temperature which an LPCVD apparatus and the negative electrode current collector 201 can withstand. The temperature is preferably set to higher than or equal to 500° C. and lower than 580° C.

In the formation of the silicon layer 211, a deposition gas containing silicon is used as a source gas. Examples of a deposition gas containing silicon include silicon hydride, silicon fluoride, and silicon chloride. Specifically, for example, $SiH_4$, $Si_2H_6$, $SiF_4$, $SiCl_4$, $Si_2Cl_6$, and the like can be given. Note that one or more of a hydrogen gas and rare gases such as helium, neon, argon, and xenon may be contained in the source gas.

Furthermore, in the formation of the silicon layer 211, the pressure is set to higher than or equal to 10 Pa and lower than or equal to 1000 Pa, preferably higher than or equal to 20 Pa and lower than or equal to 200 Pa. Note that in the case of formation of the silicon layer 221 illustrated in FIG. 1C, the pressure falls within the range in which a region of the common portion 221a which is in contact with the negative electrode current collector 201 is formed of amorphous silicon and crystalline silicon. Further, in the case of formation of the silicon layer 231 illustrated in FIG. 1D, the pressure falls within the range in which a region of the common portion 231a which is in contact with the negative electrode current collector 201 is formed of crystalline silicon.

In formation conditions of the silicon layer 211, as the flow rate of the deposition gas containing silicon is increased, the deposition rate is increased, so that amorphous silicon is likely to be formed. On the other hand, as the flow rate of the deposition gas containing silicon is reduced, the deposition rate is reduced, so that crystalline silicon is likely to be formed. Therefore, the flow rate of the deposition gas containing silicon is appropriately selected in consideration of the deposition rate and the like. For example, the flow rate of the deposition gas containing silicon may be set to greater than or equal to 300 sccm and less than or equal to 1000 sccm.

When the source gas contains phosphine, diborane, or the like, the silicon layer 211 can contain an impurity element imparting one conductivity type (e.g., phosphorus or boron).

In addition, in the case of the example illustrated in FIG. 1D, the silicon layer 231 can be easily formed by performing two formation steps by an LPCVD method. After a silicon layer is formed once, heat treatment is performed. After the heat treatment, a silicon layer is formed again. By the heat treatment, the whole of the region of the common portion 231a which is in contact with the negative electrode current collector 201 can be formed of crystalline silicon. Note that formation conditions of the silicon layer 231 are the same as those described above. The heat treatment is performed in a temperature range which is the same as that of the formation conditions of the active material and is preferably performed in a state where a source gas is not supplied.

Note that when the negative electrode current collector 201 is formed using a metal material which forms silicide, a silicide layer is formed in part of the negative electrode current collector 201 in this step. This is because active species (e.g., a radical, a hydrogen radical, and the like which are derived from the deposition gas) of the source gas of the silicon layer 211 is diffused into the negative electrode current collector 201 to react with the metal material and active species included in the negative electrode current collector 201.

In addition, the negative electrode current collector 201 may have an uneven shape in advance. With the uneven shape, the formation density of the projected portions 211b per unit area can be increased. In order that the negative electrode current collector 201 can have an uneven shape, the negative electrode current collector 201 may be subjected to a photolithography process and an etching step.

When an LPCVD method is used, the transfer of carrier ions and electrons can be facilitated at an interface between the negative electrode current collector 201 and the silicon layer 211 (the common portion 211a, in particular), resulting in an increase in the adhesion at the interface. In addition, throughput can be improved.

Figure 2B:
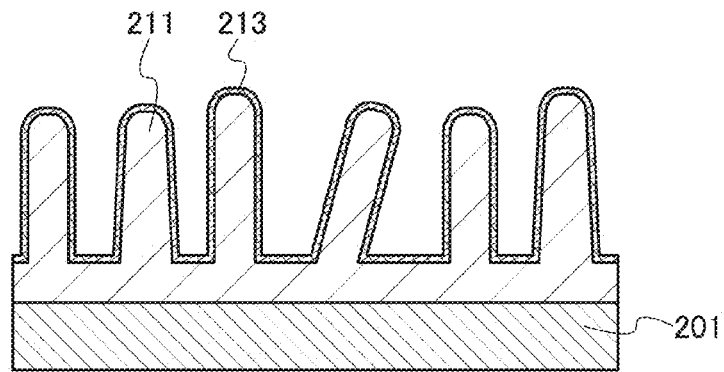

Next, as illustrated in FIG. 2B, the silicon oxide layer 213 is formed over the silicon layer 211.

The silicon oxide layer 213 is formed by a gas phase method such as a CVD method or a sputtering method. Here, the silicon oxide layer can be formed by a plasma CVD method using, as a source gas, a deposition gas containing silicon, such as silane, disilane chloride, or silane fluoride, and an oxidation gas such as dinitrogen monoxide or oxygen. Alternatively, the silicon oxide layer can be formed by a CVD method using organosilane such as tetraethoxysilane (TEOS: chemical formula: $Si(OC_2H_5)_4$) or tetramethylsilane (TMS; chemical formula: $Si(CH_3)_4$).

Figure 2C:
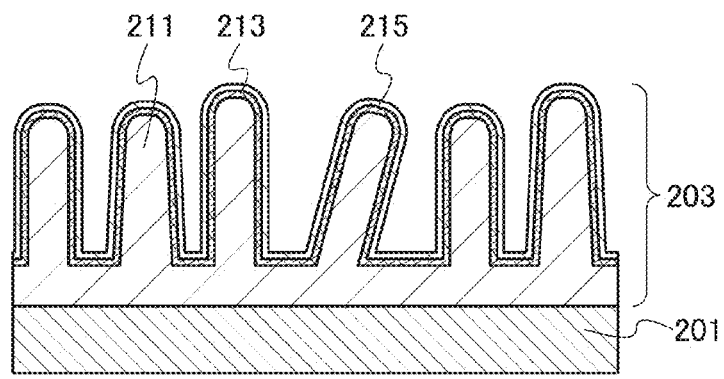

Next, as illustrated in FIG. 2C, the graphene 215 is formed over the silicon oxide layer 213. The graphene 215 can be formed over the silicon oxide layer 213 as follows: a dispersion liquid containing graphene oxide is formed; the silicon oxide layer 213 is immersed in the dispersion liquid to form graphene oxide over the silicon oxide layer 213; and reduction treatment is performed to reduce the graphene oxide. Details of the process are described below.

The dispersion liquid containing graphene oxide can be formed by any of the following methods: a method in which graphene oxide is dispersed into a solvent: a method in which graphite is oxidized in a solvent to form graphite oxide, and separation of layers of the graphite oxide is performed to liberate the graphene oxide; and the like.

In this embodiment, graphene oxide is formed by an oxidation method called a Hummers method. The Hummers method is as follows. A sulfuric acid solution of potassium permanganate, oxygenated water, or the like is mixed into single crystal graphite powder to cause oxidation reaction; thus, a graphite oxide aqueous solution is formed. The graphite oxide contains a functional group such as a carbonyl group, a carboxyl group, or a hydroxyl group due to oxidation of carbon in graphite. Accordingly, the interlayer distance between adjacent graphenes of a plurality of graphenes in graphite oxide is longer than the interlayer distance of graphite. Then, ultrasonic vibration is applied to the graphite oxide aqueous solution, so that the graphite oxide whose interlayer distance is long can be cleaved to give graphene oxide. Note that any method for forming graphene oxide can be appropriately employed instead of the Hummers method.

In a liquid having polarity, different multilayer graphenes are not easily aggregated because oxygen contained in the graphene oxide is negatively charged. Therefore, in the liquid having polarity, graphene oxide is uniformly dispersed and graphene oxide can be provided uniformly over the surface of the silicon oxide layer 213 in a later step.

As a method of providing the graphene oxide over the silicon oxide layer 213, a coating method, a spin coating method, a dipping method, a spray method, an electrophoresis method, or the like may be employed. Alternatively, these methods may be combined as appropriate to be employed.

As a method for reducing the graphene oxide provided over the silicon oxide layer 213, there is a method in which heating is performed in an atmosphere such as in vacuum, in the air, or in an inert gas (such as nitrogen or a rare gas) at a temperature higher than or equal to 150° C., preferably higher than or equal to 200° C. and lower than or equal to a temperature which the negative electrode current collector 201 can withstand. By being heated at a higher temperature for a longer time, graphene oxide is reduced to a higher extent so that graphene with high purity (i.e., with a low concentration of elements other than carbon) can be obtained. In addition, there is a method in which graphene oxide is immersed in a reducing solution to be reduced.

Since graphite is treated with sulfuric acid according to the Hummers method, a sulfone group and the like are also bonded to graphene oxide, and decomposition (release) of the sulfone group is caused at temperatures higher than or equal to 200° C. and lower than or equal to 300° C., preferably higher than or equal to 200° C. and lower than or equal to 250° C. Thus, in the method for reducing graphite oxide by heating, graphene oxide is preferably reduced at 300° C. or higher.

Through the reduction treatment, adjacent graphenes are bonded to each other to form a huge net-like or sheet-like shape. Further, through the reduction treatment, an opening is formed in the graphene due to the release of oxygen. Furthermore, the graphenes overlap with each other in parallel to a surface of the substrate. As a result, graphene in which ions can transfer between layers through openings are formed.

Through the above process, the negative electrode in which the negative electrode active material layer 203 is provided over the negative electrode current collector 201 can be formed.

(Embodiment 2)

In this embodiment, a method for forming the silicon oxide layer 213 which is different from the method described in Embodiment 1 will be described.

In this embodiment, the silicon oxide layer 213 can be formed by oxidation of part of the silicon layer 211. As a method for oxidizing the silicon layer 211, a method in which the silicon layer 211 is heated, a method in which the silicon layer 211 is subjected to plasma which is generated in an oxidation atmosphere, a method in which the silicon layer 211 is immersed in a solution containing oxidizer, and the like can be given.

In the method for forming the silicon oxide layer 213 over the silicon layer 211 by heating the silicon layer 211, the heating is performed at a temperature at which the silicon layer 211 is oxidized. Note that an atmosphere in the heating is preferably an oxidization gas atmosphere. Examples of an oxidization gas include oxygen, ozone, dinitrogen monoxide, and the like. Note that halogen may be introduced into the oxidization gas atmosphere. As a result, the silicon oxide layer 213 which contains halogen can be formed over the silicon layer 211.

In the method in which the silicon layer 211 is subjected to plasma which is generated in an oxidization atmosphere, plasma is generated in an oxidization gas atmosphere, typically in an atmosphere of oxygen, ozone, dinitrogen monoxide, or the like and the silicon layer 211 is exposed to the plasma. As a result, silicon in the silicon layer 211 and an oxygen radical in the plasma react with each other, so that the silicon oxide layer 213 can be formed.

In the method in which the silicon layer 211 is immersed in a solution containing oxidizer, the silicon layer 211 is immersed in a solution containing oxidizer such as ozone water or hydrogen peroxide. As a result, the silicon in the silicon layer 211 is oxidized by the oxidizer, whereby the silicon oxide layer 213 can be formed.

After that, the graphene 215 is formed over the silicon oxide layer 213 though process which is the same as that in Embodiment 1. In this manner, the negative electrode active material layer 203 can be formed.

(Embodiment 3)

In this embodiment, a method for forming the silicon oxide layer 213 and the graphene 215 over the silicon layer 211 which is different from the methods described in Embodiment 1 and Embodiment 2 will be described with reference to FIGS. 3A to 3C.

Figure 3A:
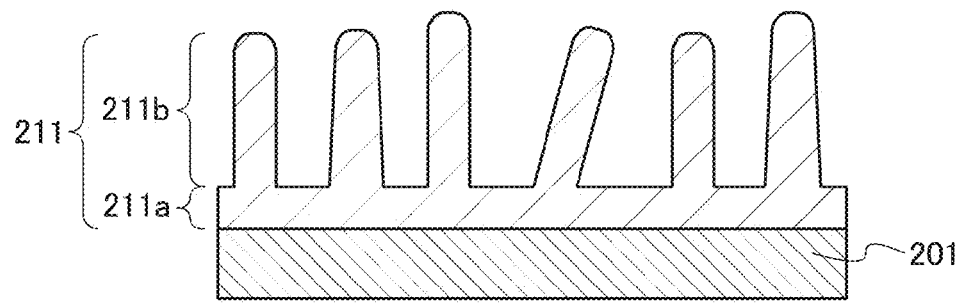
FIGS. 3A to 3C are cross-sectional views illustrating a method for manufacturing a negative electrode.
Figure 3B:
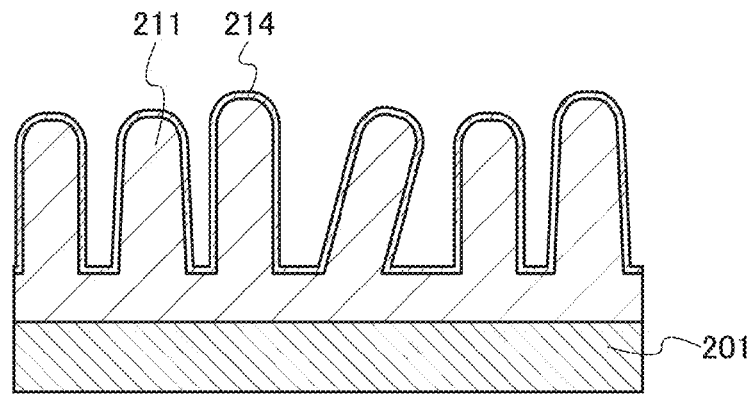

As illustrated in FIG. 3A, the silicon layer 211 is formed over the negative electrode current collector 201 in a manner similar to that described in Embodiment 1.

Next, the silicon layer 211 is immersed in a dispersion liquid in which graphene oxide is dispersed. Thus, as illustrated in FIG. 3B, graphene oxide 214 is attached to the silicon layer 211.

Figure 3C:
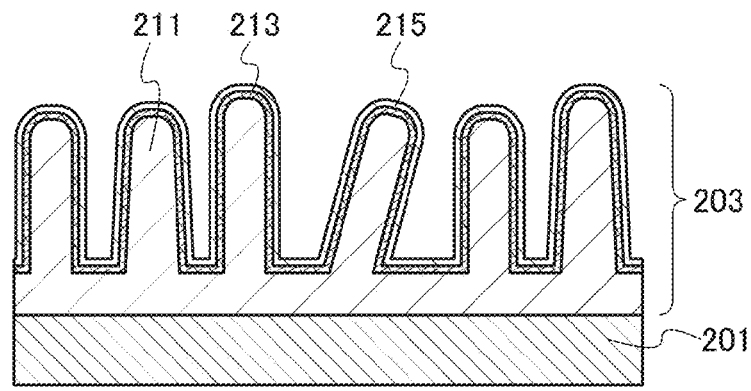

Next, heat treatment is performed at a vacuum atmosphere, a nitrogen atmosphere, or a rare gas atmosphere to reduce the graphene oxide 214, whereby the graphene 215 is formed as illustrated in FIG. 3C. In addition, in the reduction process, the silicon layer 211 and oxygen contained in the graphene oxide react with each other, whereby the silicon oxide layer 213 can be formed between the silicon layer 211 and the graphene 215.

Through the above process, the negative electrode active material layer 203 can be formed. According to this embodiment, it is possible to form the silicon oxide layer concurrently with the reduction treatment of the graphene oxide, resulting in a reduction in the number of steps for forming the negative electrode.

(Embodiment 4)

In this embodiment, a method for forming the silicon oxide layer 213 and the graphene 215 over the silicon layer 211 which is different from the methods described in Embodiment 1 to Embodiment 3 will be described with reference to FIGS. 4A to 4C.

Figure 4A:
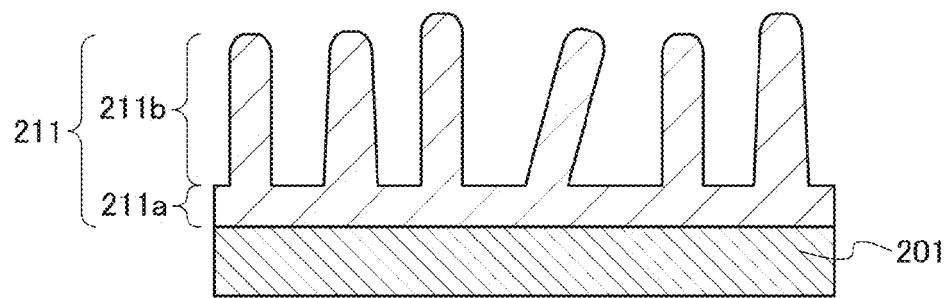
FIGS. 4A to 4C are cross-sectional views illustrating a method for manufacturing a negative electrode.

Like in Embodiment 3, the silicon layer 211 is formed over the negative electrode current collector 201 as illustrated in FIG. 4A.

Figure 4B:
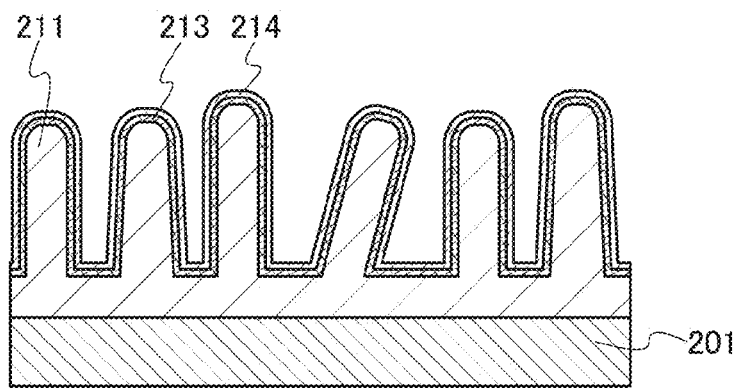
Figure 4C:
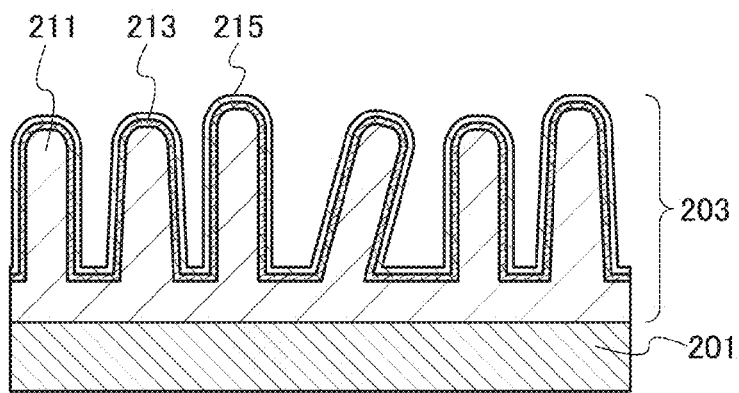

Next, as illustrated in FIG. 4B, by an electrophoresis method using a solution containing graphene oxide, part of the silicon layer 211 is oxidized to form the silicon oxide layer 213 over the silicon layer 211 and the graphene oxide 214 is provided over a surface of the silicon oxide layer 213.

Next, heat treatment is performed in a vacuum atmosphere, a nitrogen atmosphere, or a rare gas atmosphere to reduce the graphene oxide 214, whereby the graphene 215 is formed.

Through the above process, the negative electrode active material layer 203 can be formed. According to this embodiment, it is possible to form a silicon oxide layer concurrently with formation of graphene oxide over the silicon oxide layer, resulting in a reduction in the number of steps for forming the negative electrode.

(Embodiment 5)

In this embodiment, the structure of a power storage device and a method for manufacturing the power storage device will be described.

First, a positive electrode and a method for manufacturing the positive electrode are described.

Figure 5A:
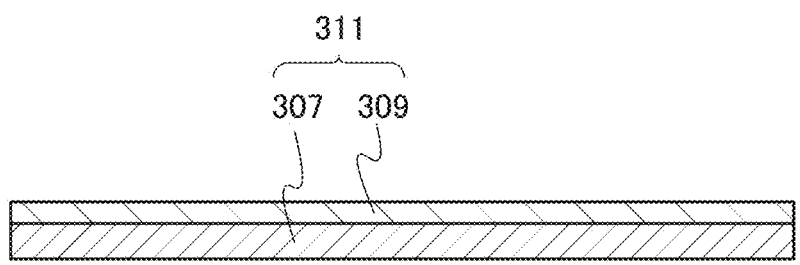
FIGS. 5A to 5C illustrate a positive electrode.

FIG. 5A is a cross-sectional view of a positive electrode 311. In the positive electrode 311, a positive electrode active material layer 309 is formed over a positive electrode current collector 307.

For the positive electrode current collector 307, a material having high conductivity such as platinum, aluminum, copper, titanium, or stainless steel can be used. The positive electrode current collector 307 can have a foil shape, a plate shape, a net shape, or the like as appropriate.

The positive electrode active material layer 309 can be formed using a lithium compound such as $LiFeO_2$, $LiCoO_2$, $LiNiO_2$, or $LiMn_2O_4$, or $V_2O_5$, $Cr_2O_5$, or $MnO_2$ as a material.

Alternatively, a lithium-containing composite oxide having an olivine structure (a general formula $LiMPO_4$ (M is one or more of Fe(II), Mn(II), Co(II), and Ni(II))) may be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a lithium-containing composite oxide such as a general formula $Li_2M_jSiO_4$ (M is one or more of Fe(II), Mn(II), Co(II), and Ni(II); 0≤j≤2) may be used. Typical examples of the general formula $Li_2MSiO_4$ which can be used as a material include lithium compounds such as $Li_2FeSiO_4$, $Li_2NiSiO_4$, $Li_2CoSiO_4$, $Li_2MnSiO_4$, $Li_2Fe_aNi_bSiO_4$, $Li_2Fe_aCo_bSiO_4$, $Li_2Fe_aMn_bSiO_4$, $Li_2Ni_aCo_bSiO_4$, $Li_2Ni_kMn_lSiO_4$ (k+l≤1, 0<k<1, and 0<l<1), $Li_2Fe_mNi_nCo_qSiO_4$, $Li_2Fe_mNi_nMn_qSiO_4$, $Li_2Ni_mCo_nMn_qSiO_4$ (m+n+q≤1, 0<m<1, 0<n<1, and 0<q<1), and $Li_2Fe_rNi_sCo_tMn_uSiO_4$ (r+s+t+u≤1, 0<r<1, 0<s<1, 0<t<1, and 0<u<1).

In the case where carrier ions are alkali metal ions other than lithium ions, alkaline-earth metal ions, beryllium ions, or magnesium ions, the positive electrode active material layer 309 may contain, instead of lithium in the lithium compound and the lithium-containing composite oxide, an alkali metal (e.g., sodium or potassium), an alkaline-earth metal (e.g., calcium, strontium, or barium), beryllium, or magnesium.

Figure 5B:
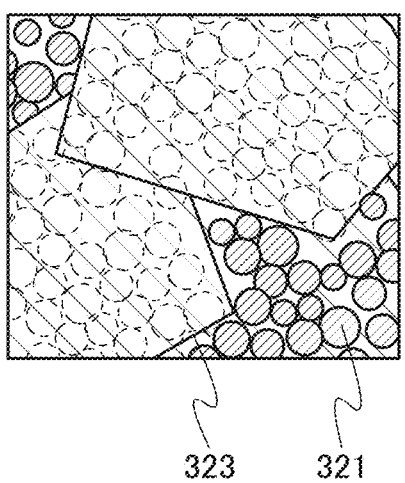

FIG. 5B is a plan view of the positive electrode active material layer 309. The positive electrode active material layer 309 includes positive electrode active materials 321 which are particles capable of occluding and releasing carrier ions, and graphene 323 which covers a plurality of particles of the positive electrode active materials 321 and at least partly surrounds the plurality of particles of the positive electrode active materials 321. The plurality of graphenes 323 cover surfaces of the plurality of particles of the positive electrode active materials 321. The positive electrode active materials 321 may partly be exposed. Note that as the graphene 323, the graphene 215 described in Embodiment 1 can be used as appropriately.

The size of the particle of the positive electrode active material 321 is preferably greater than or equal to 20 nm and less than or equal to 100 nm. Note that the size of the particle of the positive electrode active material 321 is preferably smaller because electrons transfer in the positive electrode active materials 321.

In the case where the positive electrode active material layer 309 includes the graphene 323, sufficient characteristics can be obtained even when a surface of the positive electrode active material 321 is not coated with a carbon layer; however, it is preferable to use both the graphene 323 and the positive electrode active material coated with a carbon layer because carriers transfer hopping between the positive electrode active materials and current flows.

Figure 5C:
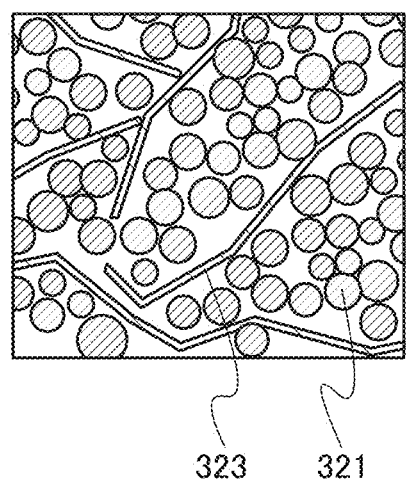

FIG. 5C is a cross-sectional view of part of the positive electrode active material layer 309 in FIG. 5B. The positive electrode active material layer 309 includes the positive electrode active materials 321 and the graphenes 323 covering the positive electrode active material 321. The graphene 323 has a linear shape when observed in the cross-sectional view. A plurality of the positive electrode active materials is surrounded with one graphene or plural graphenes. That is, the plurality of particles of the positive electrode active materials exist within one graphene or among plural graphenes. Note that the graphene has a bag-like shape, and the plurality of particles of the positive electrode active materials is surrounded with the bag-like portion in some cases. In addition, the positive electrode active materials are not covered with the graphenes and partly exposed in some cases.

The desired thickness of the positive electrode active material layer 309 is determined in the range greater than or equal to 20 μm and less than or equal to 100 μm. It is preferable to adjust the thickness of the positive electrode active material layer 309 as appropriate so that a crack and separation are not caused.

Note that the positive electrode active material layer 309 may include acetylene black particles having a volume 0.1 times to 10 times as large as that of the graphene, carbon particles having a one-dimensional expansion (e.g., carbon nanofibers), or other known binders.

As an example of the positive electrode active material, there is a material whose volume is expanded by occlusion of ions serving as carriers. When such a material is used, the positive electrode active material layer becomes friable and is partly collapsed by charge and discharge, resulting in lower reliability of a power storage device. However, the graphene 323 covering the periphery of the positive electrode active materials allows prevention of dispersion of the positive electrode active materials and the collapse of the positive electrode active material layer, even when the volume of the positive electrode active materials is changed due to charge and discharge. That is to say, the graphene has a function of maintaining the bond between the positive electrode active materials even when the volume of the positive electrode active materials is increased and decreased by charge and discharge.

The graphene 323 is in contact with a plurality of particles of the positive electrode active materials and serves also as a conductive additive. Further, the graphene 323 has a function of holding the positive electrode active materials 321 capable of occluding and releasing carrier ions. Thus, a binder does not have to be mixed into the positive electrode active material layer. Accordingly, the proportion of the positive electrode active materials in the positive electrode active material layer can be increased and the discharge capacity of a power storage device can be increased.

Next, a method for manufacturing the positive electrode active material layer 309 is described.

Slurry containing positive electrode active materials which are particles and graphene oxide is formed. After the slurry is applied onto the positive electrode current collector, heating is performed in a reducing atmosphere for reduction treatment so that the positive electrode active materials are baked and oxygen is released from graphene oxide to form openings in graphene, as in the method for forming graphene, which is described in Embodiment 1. Note that oxygen in the graphene oxide is not entirely reduced and partly remains in the graphene. Through the above process, the positive electrode active material layer 309 can be formed over the positive electrode current collector 307. Consequently, the positive electrode active material layer has higher conductivity.

Graphene oxide contains oxygen and thus is negatively charged in a polar liquid. As a result of being negatively charged, graphene oxide is dispersed. Accordingly, the positive electrode active materials contained in the slurry are not easily aggregated, so that the size of the particle of the positive electrode active material can be prevented from increasing by baking. Thus, the transfer of electrons in the positive electrode active materials is facilitated, resulting in an increase in conductivity of the positive electrode active material layer.

Next, the structure of a power storage device and a method for manufacturing the power storage device are described.

A lithium-ion secondary battery which is a typical example of a power storage device according to this embodiment will be described with reference to FIG. 6. Here, a cross-sectional structure of the lithium-ion secondary battery is described below.

Figure 6:
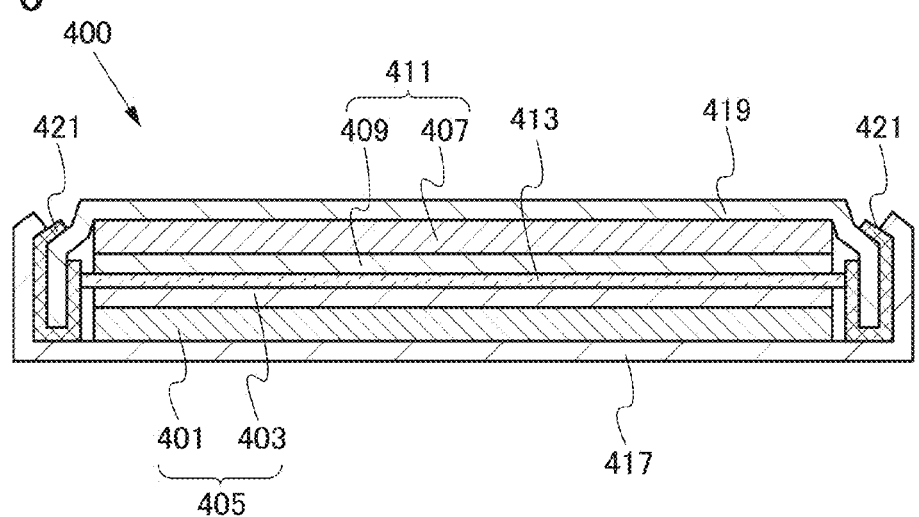
FIG. 6 illustrates a power storage device.

FIG. 6 is a cross-sectional view of the lithium-ion secondary battery.

A lithium-ion secondary battery 400 includes a negative electrode 411 including a negative electrode current collector 407 and a negative electrode active material layer 409, a positive electrode 405 including a positive electrode current collector 401 and a positive electrode active material layer 403, and a separator 413 provided between the negative electrode 411 and the positive electrode 405. Note that the separator 413 includes an electrolyte 415. The negative electrode current collector 407 is connected to an external terminal 419 and the positive electrode current collector 401 is connected to an external terminal 417. An end portion of the external terminal 419 is embedded in a gasket 421. In other words, the external terminals 417 and 419 are insulated from each other with the gasket 421.

As the negative electrode current collector 407 and the negative electrode active material layer 409, the negative electrode current collector 201 and the negative electrode active material layer 203 which are described in Embodiments 1 to 3 can be used as appropriate.

As the positive electrode current collector 401 and the positive electrode active material layer 403, the positive electrode current collector 307 and the positive electrode active material layer 309 which are described in this embodiment can be used as appropriate.

An insulating porous material is used for the separator 413. Typical examples of the separator 413 include cellulose (paper), polyethylene, and polypropylene.

As a solute of the electrolyte 415, a material containing carrier ions is used. Typical examples of the solute of the electrolyte include lithium salt such as $LiClO_4$, $LiAsF_6$, $LiBF_4$, $LiPF_6$, and $Li(C_2F_5SO_2)_2N$.

Note that when carrier ions are alkali metal ions other than lithium ions, alkaline-earth metal ions, beryllium ions, or magnesium ions, instead of lithium in the above lithium salts, an alkali metal (e.g., sodium or potassium), an alkaline-earth metal (e.g., calcium, strontium, or barium), beryllium, or magnesium may be used for a solute of the electrolyte 415.

As a solvent of the electrolyte 415, a material in which carrier ions can transfer is used. As the solvent of the electrolyte 415, an aprotic organic solvent is preferably used. Typical examples of an aprotic organic solvent include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled polymer material is used as the solvent of the electrolyte 415, safety against liquid leakage or the like is increased. Further, the lithium-ion secondary battery 400 can be made thinner and more lightweight. Typical examples of a gelled polymer material include a silicon gel, an acrylic gel, an acrylonitrile gel, polyethylene oxide, polypropylene oxide, a fluorine-based polymer, and the like.

As the electrolyte 415, a solid electrolyte such as $Li_3PO_4$ can be used. Note that in the case of using the solid electrolyte as the electrolyte 415, the separator 413 is unnecessary.

For the external terminals 417 and 419, a metal member such as a stainless steel plate or an aluminum plate can be used as appropriate.

Note that in this embodiment, a coin-type lithium-ion secondary battery is given as the lithium-ion secondary battery 400; however, any of lithium-ion secondary batteries with various shapes, such as a sealing-type lithium-ion secondary battery, a cylindrical lithium-ion secondary battery, and a square-type lithium-ion secondary battery, can be used. Further, a structure in which a plurality of positive electrodes, a plurality of negative electrodes, and a plurality of separators are stacked or rolled may be employed.

Next, a method for manufacturing the lithium-ion secondary battery 400 described in this embodiment is described.

By the formation method described in Embodiments 1 to 3, the positive electrode 405 and the negative electrode 411 are formed as appropriate.

Next, the positive electrode 405, the separator 413, and the negative electrode 411, are impregnated with the electrolyte 415. Then, the positive electrode 405, the separator 413, the gasket 421, the negative electrode 411, and the external terminal 419 are stacked in this order over the external terminal 417, and the external terminal 417 and the external terminal 419 are crimped to each other with a "coin cell crimper". Thus, the coin-type lithium-ion secondary battery can be manufactured.

Note that a spacer and a washer may be provided between the external terminal 417 and the positive electrode 405 or between the external terminal 419 and the negative electrode 411 so that connection between the external terminal 417 and the positive electrode 405 or between the external terminal 419 and the negative electrode 411 is enhanced.

(Embodiment 6)

A power storage device according to one embodiment of the present invention can be used as a power supply of various electric appliances which are driven by electric power.

Specific examples of electric appliances using the power storage device according to one embodiment of the present invention are as follows: display devices, lighting devices, desktop personal computers or laptop personal computers, image reproduction devices which reproduce a still image or a moving image stored in a recording medium such as a digital versatile disc (DVD), mobile phones, portable game machines, portable information terminals, e-book readers, video cameras, digital still cameras, high-frequency heating apparatus such as microwaves, electric rice cookers, electric washing machines, air-conditioning systems such as air conditioners, electric refrigerators, electric freezers, electric refrigerator-freezers, freezers for preserving DNA, dialysis devices, and the like. In addition, moving objects driven by an electric motor using electric power from a power storage device are also included in the category of electric appliances. As examples of the moving objects, electric vehicles, hybrid vehicles which include both an internal-combustion engine and a motor, motorized bicycles including motor-assisted bicycles, and the like can be given.

In the electric appliances, the power storage device according to one embodiment of the present invention can be used as a power storage device for supplying enough electric power for almost the whole power consumption (such a power storage device is referred to as a main power supply). Alternatively, in the electric appliances, the power storage device according to one embodiment of the present invention can be used as a power storage device which can supply electric power to the electric appliances when the supply of power from the main power supply or a commercial power supply is stopped (such a power storage device is referred to as an uninterruptible power supply). Further alternatively, in the electric appliances, the power storage device according to one embodiment of the present invention can be used as a power storage device for supplying electric power to the electric appliances at the same time as the electric power supply from the main power supply or a commercial power supply (such a power storage device is referred to as an auxiliary power supply).

Figure 7:
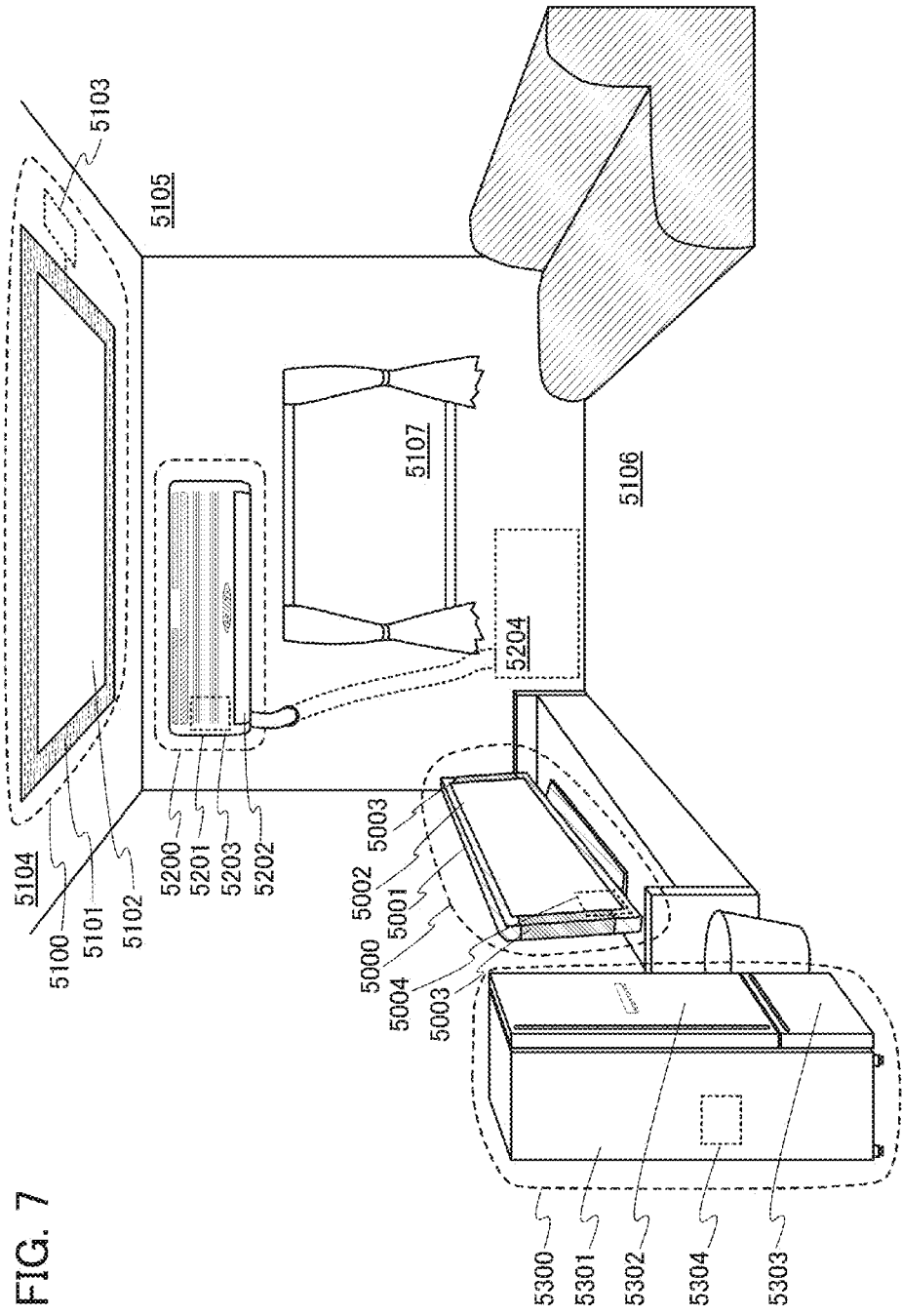
FIG. 7 illustrates electric appliances.

FIG. 7 shows specific structures of the electric appliances. In FIG. 7, a display device 5000 is an example of an electric appliance including a power storage device 5004 according to one embodiment of the present invention. Specifically, the display device 5000 corresponds to a display device for TV broadcast reception and includes a housing 5001, a display portion 5002, speaker portions 5003, the power storage device 5004, and the like. The power storage device 5004 according to one embodiment of the present invention is provided inside the housing 5001. The display device 5000 can receive electric power from a commercial power supply. Alternatively, the display device 5000 can use electric power stored in the power storage device 5004. Thus, the display device 5000 can be operated with the use of the power storage device 5004 according to one embodiment of the present invention as an uninterruptible power supply even when electric power cannot be supplied from the commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 5002.

Note that the display device includes, in its category, all of information display devices for personal computers, advertisement displays, and the like other than TV broadcast reception.

In FIG. 7, an installation lighting device 5100 is an example of an electric appliance including a power storage device 5103 according to one embodiment of the present invention. Specifically, the installation lighting device 5100 includes a housing 5101, a light source 5102, the power storage device 5103, and the like. FIG. 7 shows the example where the power storage device 5103 is provided in a ceiling 5104 on which the housing 5101 and the light source 5102 are installed; alternatively, the power storage device 5103 may be provided in the housing 5101. The installation lighting device 5100 can receive electric power from the commercial power supply. Alternatively, the installation lighting device 5100 can use electric power stored in the power storage device 5103. Thus, the installation lighting device 5100 can be operated with the use of the power storage device 5103 according to one embodiment of the present invention as an uninterruptible power supply even when electric power cannot be supplied from the commercial power supply because of power failure or the like.

Note that although the installation lighting device 5100 provided in the ceiling 5104 is illustrated in FIG. 7 as an example, the power storage device according to one embodiment of the present invention can be used in an installation lighting device provided in, for example, a wall 5105, a floor 5106, a window 5107, or the like other than the ceiling 5104. Alternatively, the power storage device can be used in a tabletop lighting device and the like.

As the light source 5102, an artificial light source which provides light artificially by using electric power can be used. Specifically, a discharge lamp such as an incandescent lamp and a fluorescent lamp, and a light-emitting element such as an LED and an organic EL element are given as examples of the artificial light source.

In FIG. 7, an air conditioner including an indoor unit 5200 and an outdoor unit 5204 is an example of an electric appliance including a power storage device 5203 according to one embodiment of the invention. Specifically, the indoor unit 5200 includes a housing 5201, a ventilation duct 5202, the power storage device 5203, and the like. FIG. 7 shows the example in which the power storage device 5203 is provided in the indoor unit 5200; alternatively, the power storage device 5203 may be provided in the outdoor unit 5204. Further alternatively, the power storage devices 5203 may be provided in both the indoor unit 5200 and the outdoor unit 5204. The air conditioner can receive electric power from the commercial power supply. Alternatively, the air conditioner can use electric power stored in the power storage device 5203. Specifically, in the case where the power storage devices 5203 are provided n both the indoor unit 5200 and the outdoor unit 5204, the air conditioner can be operated with the use of the power storage device 5203 according to one embodiment of the present invention as an uninterruptible power supply even when electric power cannot be supplied from the commercial power supply due to power failure or the like.

Although the separated air conditioner including the indoor unit and the outdoor unit is illustrated in FIG. 7 as an example, the power storage device according to one embodiment of the present invention can be used in an air conditioner in which one housing is equipped with the functions of an indoor unit and an outdoor unit.

In FIG. 7, an electric refrigerator-freezer 5300 is an example of an electric appliance including a power storage device 5304 according to one embodiment of the present invention. Specifically, the electric refrigerator-freezer 5300 includes a housing 5301, a door for a refrigerator 5302, a door for a freezer 5303, and the power storage device 5304. The power storage device 5304 is provided in the housing 5301 in FIG. 7. Alternatively, the electric refrigerator-freezer 5300 can receive electric power from the commercial power supply or can use power stored in the power storage device 5304. Thus, the electric refrigerator-freezer 5300 can be operated with the use of the power storage device 5304 according to one embodiment of the present invention as an uninterruptible power supply even when electric power cannot be supplied from the commercial power supply because of power failure or the like.

Note that among the electric appliances described above, a high-frequency heating apparatus such as a microwave and an electric appliance such as an electric rice cooker require high electric power in a short time. The tripping of a circuit breaker of a commercial power supply in use of electric devices can be prevented by using the power storage device according to one embodiment of the present invention as an auxiliary power supply for supplying electric power which cannot be supplied enough by a commercial power supply.

In addition, in a time period when electric appliances are not used, specifically when the proportion of the amount of power which is actually used to the total amount of power which can be supplied by a commercial power supply source (such a proportion referred to as usage rate of power) is low, power can be stored in the power storage device, whereby the usage rate of power can be reduced in a time period when the electric appliances are used. In the case of the electric refrigerator-freezer 5300, electric power can be stored in the power storage device 5304 at night time when the temperature is low and the door for a refrigerator 5302 and the door for a freezer 5303 are not opened and closed. The power storage device 5304 is used as an auxiliary power supply in daytime when the temperature is high and the door for a refrigerator 5302 and the door for a freezer 5303 are opened and closed; thus, the usage rate of electric power in daytime can be reduced.

This embodiment can be implemented by being combined as appropriate with any of the above embodiments.

EXAMPLE 1

In this example, as a negative electrode active material layer, a silicon oxide layer and graphene were formed over a silicon layer with projections and depressions, and TEM observation was performed thereon. First, a method for forming samples is described.

At the beginning, an aqueous solution containing 0.5 mg/ml of graphene oxide was prepared. Further, an uneven silicon layer was formed over a titanium sheet.

The uneven silicon layer was formed to a thickness of 0.1 nm over a titanium sheet with a diameter of 12 mm by a LPCVD method in which silane and nitrogen were each introduced as a material at flow rate of 300 sccm into a chamber where the pressure was 150 Pa and the temperature was 550° C. After that, the titanium sheet was kept in an air atmosphere.

Next, a graphene oxide dispersion liquid was prepared. The solution can be manufactured in such a manner that graphite oxide is formed by Hummer method and ultrasonic vibration is applied thereto, as described in Embodiment 1; however, in this example, a graphene oxide aqueous solution manufactured by Graphene Supermarket (the concentration: 0.275 mg/ml; the flake size: 0.5 μm to 5 μm) was used.

Next, by an electrophoresis method, a silicon oxide layer was formed over the uneven silicon layer and graphene oxide was provided over the silicon oxide layer. Here, the titanium sheet with the uneven silicon layer was immersed in the graphene oxide dispersion liquid, and a stainless steel plate was immersed therein as an electrode. The distance between the titanium sheet and the stainless steel plate was 1 cm. Then, a voltage of 10 V was applied between the titanium sheet and the stainless steel plate for 30 seconds. The amount of charge flowing at that time was 0.223 C.

Next, the titanium sheet was dried with a hot plate at 50° C. for a few minutes and then left for 10 hours in a glass tube oven maintained at 300° C. so that the graphene oxide was subjected to reduction treatment. Thus, graphene was formed. Through the above steps, Sample 1 was manufactured.

As a comparative example, Comparative sample 1 which had the same structure as Sample 1 except that graphene was not formed therein was manufactured.

Figure 8:
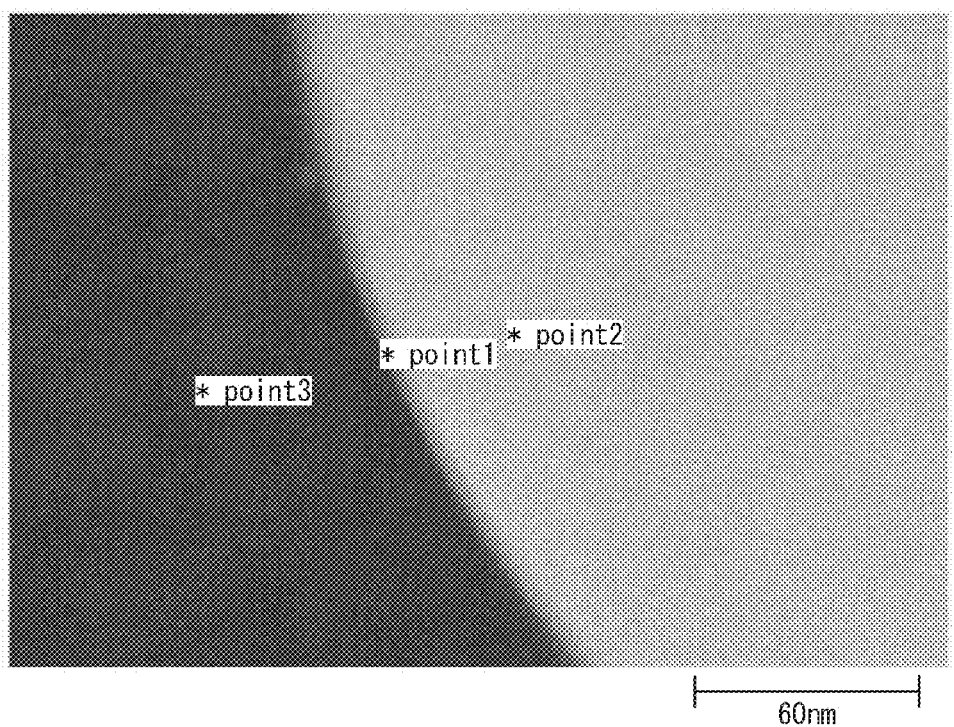
FIG. 8 is an HAADF-STEM image of a negative electrode active material.

An observation result of a cross section of Sample 1 by high-angle annular dark-field scanning transmission electron microscopy (HAADF-STEM) is shown in FIG. 8. Point 2 indicates the silicon layer and Point 3 indicates a carbon layer for promoting observation. A region with a different contrast (Point 1) lies between the silicon layer and the carbon layer. Next, composition elements of Point 1 to Point 3 which are denoted by asterisks were analyzed with an energy dispersive X-ray spectroscopy (EDX).

Figure 9A:
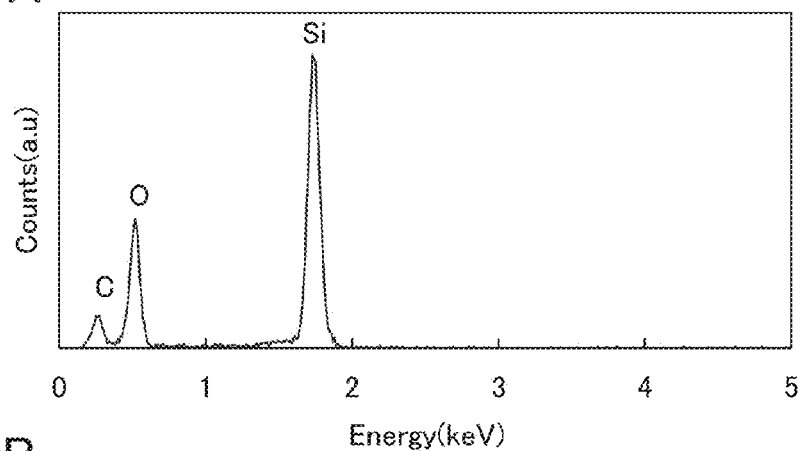
FIGS. 9A to 9C show EDX analysis results of a negative electrode active material.
Figure 9B:
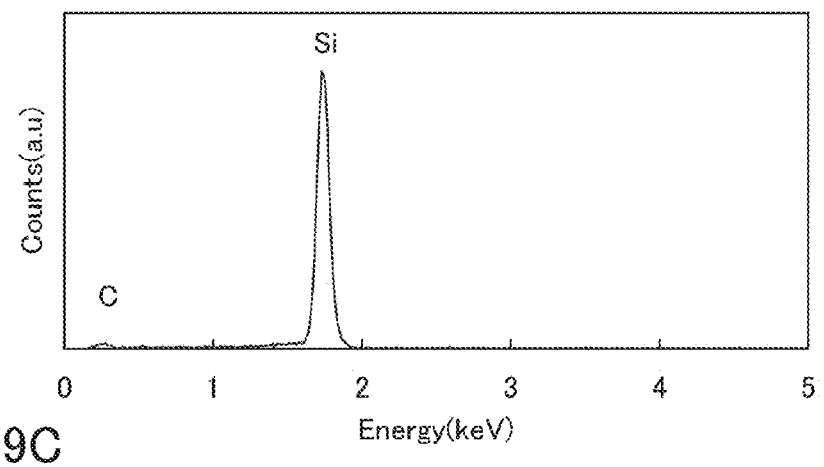
Figure 9C:
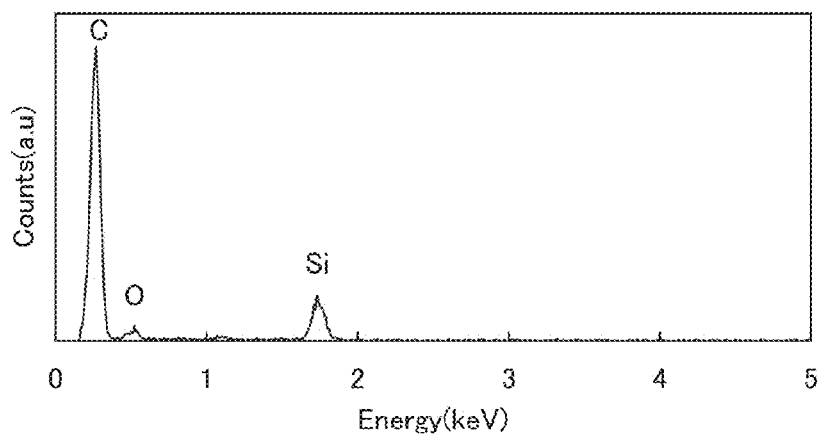

FIGS. 9A, 9B, and 9C show the results of the element analysis of Point 1, Point 2, and Point 3, respectively.

In FIG. 9A, Si, O, and C are detected, which shows that the silicon oxide layer is formed at Point 1.

Note that Si was detected at Point 2 which is part of the silicon layer as shown in FIG. 9B, and C was detected at Point 3 which is part of the carbon layer as illustrated in FIG. 9C.

Figure 10A:
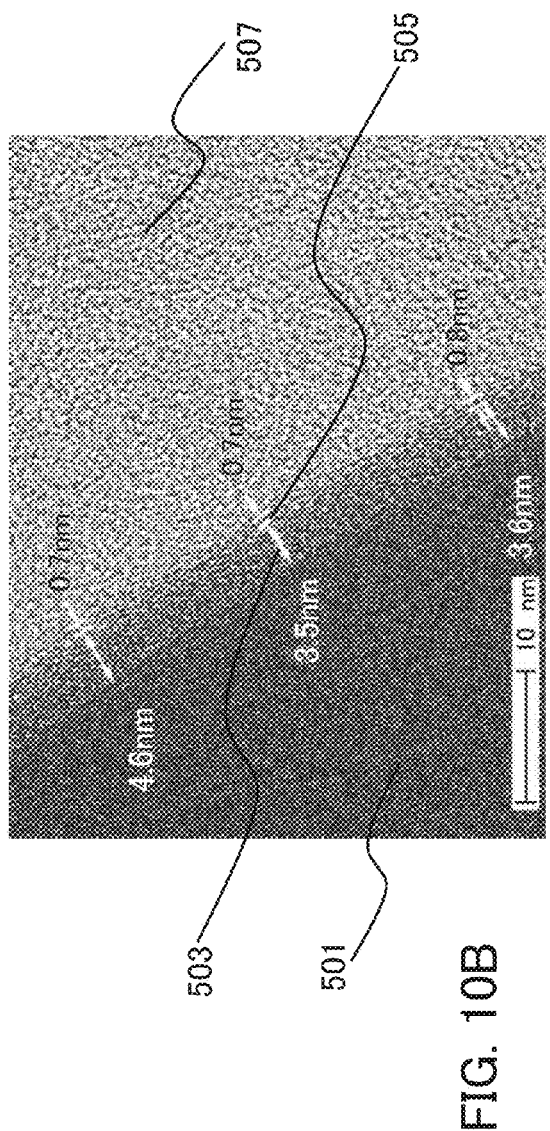
FIGS. 10A and 10B are TEM images of a negative electrode active material.
Figure 10B:
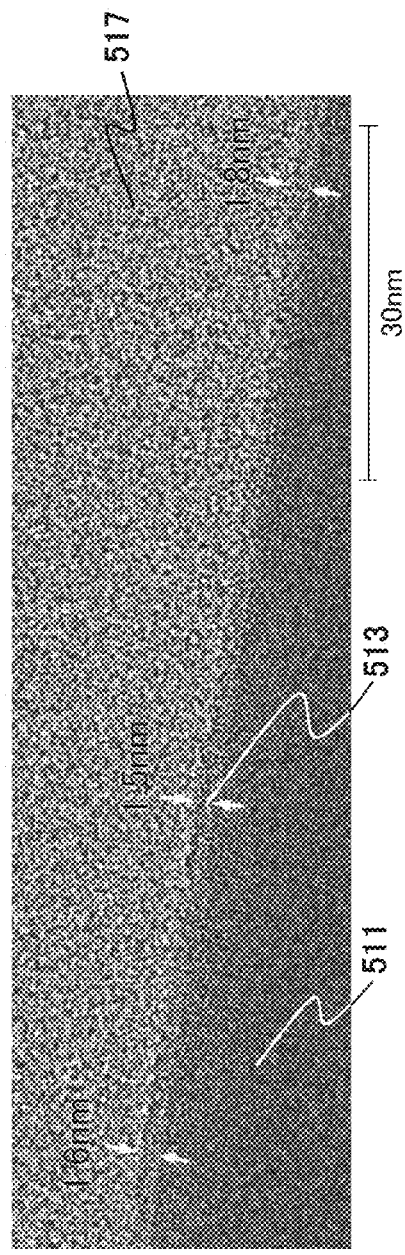

Next, FIGS. 10A and 10B show observation results of Sample 1 and Comparative sample 1 by a transmission electron microscopy (TEM).

FIG. 10A is a cross-sectional TEM micrograph of Sample 1 (magnification of 2,050,000 times and FIG. 10B is that of Comparative sample 1 (magnification of 1,500,000 time). In FIG. 10A, a silicon oxide layer 503 is formed over an uneven silicon layer 501, and graphene 505 is formed over the silicon oxide layer 503. Linear layers with a low contrast (white layers) are stacked along a surface of the silicon layer. A region including the linear layers corresponds to the graphene 505 with high crystallinity. A carbon layer 507 for promoting observation is provided over the graphene 505. An average thickness of the silicon oxide layer was 3.9 nm, and an average thickness of the graphene 505 was 0.73 nm.

On the other hand, in FIG. 10B, a silicon oxide layer 513 is formed over an uneven silicon layer 511. A carbon layer 517 for promoting observation is provided over the silicon oxide layer 513. An average thickness of the silicon oxide layer was 1.63 nm.

It is found from Comparative sample 1 that a native oxide layer is formed over a surface of the uneven silicon layer when the uneven silicon layer is stored in an air atmosphere. In addition, it is found from the comparison of Sample 1 and Comparative sample 1 that, by an electrophoresis method and reduction treatment of the graphene oxide, a silicon oxide layer is newly formed over the uneven silicon layer together with the native oxide layer and graphene is formed over the silicon oxide layer.

This application is based on Japanese Patent Application serial no. 2011-189335 filed with Japan Patent Office on Aug. 31, 2011, the entire contents of which are hereby incorporated by reference.

What is claimed is:

1. A power storage device comprising:
   a positive electrode;
   a negative electrode including a negative electrode current collector and a negative electrode active material layer; and
   an electrolyte provided between the positive electrode and the negative electrode,
   wherein the negative electrode active material layer includes:
      an uneven silicon layer over the negative electrode current collector;
      a first layer including silicon oxide, the first layer being over and in contact with the uneven silicon layer; and
      graphene in contact with the first layer.

2. The power storage device according to claim 1, wherein the first layer has a thickness greater than or equal to 2 nm and less than or equal to 10 nm.

3. The power storage device according to claim 1, wherein the uneven silicon layer includes crystalline silicon.

4. The power storage device according to claim 1, wherein the uneven silicon layer includes amorphous silicon.

5. The power storage device according to claim 1, wherein the uneven silicon layer includes crystalline silicon and amorphous silicon covering the crystalline silicon.

6. The power storage device according to claim 1, wherein the first layer includes the silicon oxide and a silicate compound.

7. An electric device comprising the power storage device according to claim 1.

8. A power storage device comprising:
   a positive electrode;
   a negative electrode including a negative electrode current collector and a negative electrode active material layer; and
   an electrolyte provided between the positive electrode and the negative electrode,
   wherein the negative electrode active material layer includes:
      a silicon layer over the negative electrode current collector, the silicon layer including a common portion and a projected portion;
      a first layer including silicon oxide, the first layer being over and in contact with the silicon layer; and
      graphene over and in contact with the first layer,
      wherein the common portion is in contact with an entire surface of the negative electrode current collector, and
      wherein the projected portion is extended from the common portion.

9. The power storage device according to claim 8, wherein the first layer has a thickness greater than or equal to 2 nm and less than or equal to 10 nm.

10. The power storage device according to claim 8, wherein the silicon layer includes crystalline silicon.

11. The power storage device according to claim 8, wherein the silicon layer includes amorphous silicon.

12. The power storage device according to claim 8, wherein the silicon layer includes crystalline silicon and amorphous silicon covering the crystalline silicon.

13. The power storage device according to claim 8, wherein the first layer includes the silicon oxide and a silicate compound.

14. An electric device comprising the power storage device according to claim 8.

15. A power storage device comprising:
   a positive electrode;
   a negative electrode including a negative electrode current collector and a negative electrode active material layer; and
   an electrolyte provided between the positive electrode and the negative electrode,
   wherein the negative electrode active material layer includes:
      a silicon layer over the negative electrode current collector, the silicon layer including a common portion and a projected portion;
      a first layer including silicon oxide, the first layer being over and in contact with the silicon layer; and
      graphene over and in contact with the first layer,
      wherein the common portion is in contact with an entire surface of the negative electrode current collector,
      wherein the projected portion is extended from the common portion,
      wherein the silicon layer includes a core which is included in the common portion and the projected portion,
      wherein the core includes crystalline silicon and the silicon layer includes amorphous silicon covering the crystalline silicon.

16. The power storage device according to claim 15, wherein the first layer has a thickness greater than or equal to 2 nm and less than or equal to 10 nm.

17. The power storage device according to claim 15, wherein the first layer includes the silicon oxide and a silicate compound.

18. An electric device comprising the power storage device according to claim 15.

* * * * *